(12) United States Patent
Shimamoto et al.

(10) Patent No.: US 9,618,741 B2
(45) Date of Patent: Apr. 11, 2017

(54) OPTICAL SCANNING APPARATUS

(71) Applicants: OLYMPUS CORPORATION, Tokyo (JP); TOHOKU UNIVERSITY, Miyagi (JP)

(72) Inventors: Atsuyoshi Shimamoto, Tokyo (JP); Yoichi Haga, Miyagi (JP); Tadao Matsunaga, Miyagi (JP)

(73) Assignees: OLYMPUS CORPORATION, Tokyo (JP); TOHOKU UNIVERSITY, Miyagi (JP)

( * ) Notice: Subject to any disclaimer, the term of this patent is extended or adjusted under 35 U.S.C. 154(b) by 0 days.

(21) Appl. No.: 14/809,678

(22) Filed: Jul. 27, 2015

(65) Prior Publication Data

US 2015/0331233 A1  Nov. 19, 2015

Related U.S. Application Data

(63) Continuation of application No. PCT/JP2014/051849, filed on Jan. 28, 2014.

(30) Foreign Application Priority Data

Jan. 29, 2013 (JP) ................................. 2013-014256

(51) Int. Cl.
*G02B 26/10* (2006.01)

(52) U.S. Cl.
CPC .................................. *G02B 26/103* (2013.01)

(58) Field of Classification Search
CPC .................................................. G02B 26/103
See application file for complete search history.

(56) References Cited

U.S. PATENT DOCUMENTS 5,727,098 A   3/1998 Jacobson
7,123,790 B2  10/2006 Rosman et al.
(Continued)

FOREIGN PATENT DOCUMENTS

EP   1 142 529 A1   10/2001
JP   2007-275220 A  10/2007
(Continued)

OTHER PUBLICATIONS

International Search Report dated Feb. 25, 2014 issued in PCT/JP2014/051849.
(Continued)

*Primary Examiner* — Omar R Rojas
(74) *Attorney, Agent, or Firm* — Scully, Scott, Murphy & Presser, P.C.

(57) ABSTRACT

An optical scanning apparatus for efficiently performing scanning with light by efficiently increasing amplitude of an emission end of an optical fiber is provided. The optical scanning apparatus includes an optical fiber that guides illumination light emitted from a light source so that the illumination light is emitted from the emission end, a magnetic body fixed to the optical fiber, and a magnetic field generating unit changing a magnetic field to act on the magnetic body to displace a position of the emission end in a radial direction by magnetic force, and the magnetic field generating unit includes a plurality of coils for individually generating magnetic fields acting on the magnetic body at positions separate from each other in a longitudinal direction of the optical fiber, and the magnetic fields acting on the magnetic body can be individually adjusted at the positions.

17 Claims, 14 Drawing Sheets

(56) References Cited

U.S. PATENT DOCUMENTS

| | | | |
|---|---|---|---|
| 7,129,472 B1 * | 10/2006 | Okawa | A61B 1/00059 |
| | | | 250/216 |
| 2005/0002085 A1 | 1/2005 | Matsui | |
| 2006/0152106 A1 | 7/2006 | Yan et al. | |
| 2009/0015894 A1 * | 1/2009 | Rosman | A61B 5/0062 |
| | | | 359/199.1 |
| 2010/0207015 A1 * | 8/2010 | Bierhoff | A61B 5/0062 |
| | | | 250/227.26 |
| 2012/0113491 A1 | 5/2012 | Hezemans et al. | |

FOREIGN PATENT DOCUMENTS

| | | |
|---|---|---|
| JP | 2008-116922 A | 5/2008 |
| JP | 2010-009035 A | 1/2010 |
| JP | 2010-534347 A | 11/2010 |
| JP | 2012-231911 A | 11/2012 |
| WO | WO 2009/013663 A2 | 1/2009 |
| WO | WO 2013/031824 A1 | 3/2013 |
| WO | WO 2013/069382 A1 | 5/2013 |

OTHER PUBLICATIONS

Matsunaga, T. et al., "Electromagnetically Driven Ultra-Miniature Single Fiber Scanner for High-Resolution Endoscopy Fabricated on Cylindrical Substrates Using MEMS Process", Micro Electro Mechanical Systems (MEMS), 2010 IEEE 23rd International Conference on, Jan. 24, 2010, pp. 999-1002.

Extended Partial Supplementary European Search Report dated Aug. 3, 2016 in related European Application No. 14 74 6065.3.

Extended Supplementary European Search Report dated Oct. 21, 2016 in related European Patent Application No. 14 74 6065.3.

* cited by examiner

<FIRST ORDER RESONANCE · NON RESONANCE>

<SECOND ORDER RESONANCE>

<THIRD ORDER RESONANCE>

<SECOND ORDER RESONANCE>

<THIRD ORDER RESONANCE>

OPTICAL SCANNING APPARATUS

CROSS-REFERENCE TO RELATED APPLICATIONS

This application is a Continuation Application of International Application PCT/JP2014/051849 filed on Jan. 28, 2014, which claims priority to Japanese Application No. 2013-014256 filed on Jan. 29, 2013.
The Contents of International Application PCT/JP2014/051849 and Japanese application No. 2013-014256 are hereby incorporated by reference herein in its entirety.

TECHNICAL FIELD

The present invention relates to an optical scanning apparatus.

BACKGROUND ART

Conventionally, an optical scanning device is known, in which a cylindrical permanent magnet having different magnetic poles at both ends in a longitudinal direction is fixed near an emission end of an optical fiber, and a gradient coil is wound along a cylindrical face surrounding the permanent magnet. This optical scanning device generates magnetic field lines which are inclined with respect to a longitudinal axis of the cylindrical face by flowing alternating current to the gradient coil, and reciprocates the emission end of the optical fiber in a radial direction by resonance using magnetic force acting on the permanent magnet, so as to perform scanning with light emitted from the emission end in a two-dimensional manner.

CITATION LIST

Patent Literature

{PTL 1}
Japanese Unexamined Patent Application, Publication No. 2010-9035

SUMMARY OF INVENTION

Technical Problem

However, in the optical scanning device of PTL 1, because a coil for generating a magnetic field acting on the permanent magnet is a single single-layer coil surrounding the whole or part of the permanent magnet, or a double-layer coil wound at the same position in an overlapped manner, it is impossible to generate different magnetic fields to act on the magnetic poles at both ends of the permanent magnet. That is, when the permanent magnet is displaced by resonance by flowing alternating current to the coil, because an amount of displacement or a direction of displacement of the permanent magnet differs according to resonance modes, a single magnetic field to act on the magnetic poles at both ends of the permanent magnet cannot efficiently increase amplitude of the emission end of the optical fiber.

The present invention has been made in view of the above-described circumstances, and an object of the present invention is to provide an optical scanning apparatus which can efficiently perform scanning with light by efficiently increasing amplitude of an emission end of an optical fiber.

Solution to Problem

To achieve the above-described object, the present invention provides the following solutions.

One aspect of the present invention is an optical scanning apparatus including an optical fiber that guides illumination light emitted from a light source so that the illumination light is emitted from an emission end, a magnetic body fixed to the optical fiber, and a magnetic field generating unit that changes a magnetic field to act on the magnetic body to displace a position of the emission end in a radial direction by magnetic force, the magnetic field generating unit including a plurality of coils for individually generating magnetic fields to act on the magnetic body at positions separate from each other in a longitudinal direction of the optical fiber, and the magnetic field generating unit being provided so that the magnetic fields to act on the magnetic body can be individually adjusted at each of the positions.

DESCRIPTION OF EMBODIMENTS

An optical scanning apparatus 1 according to one embodiment of the present invention will be described below with reference to the drawings.

Figure 1:
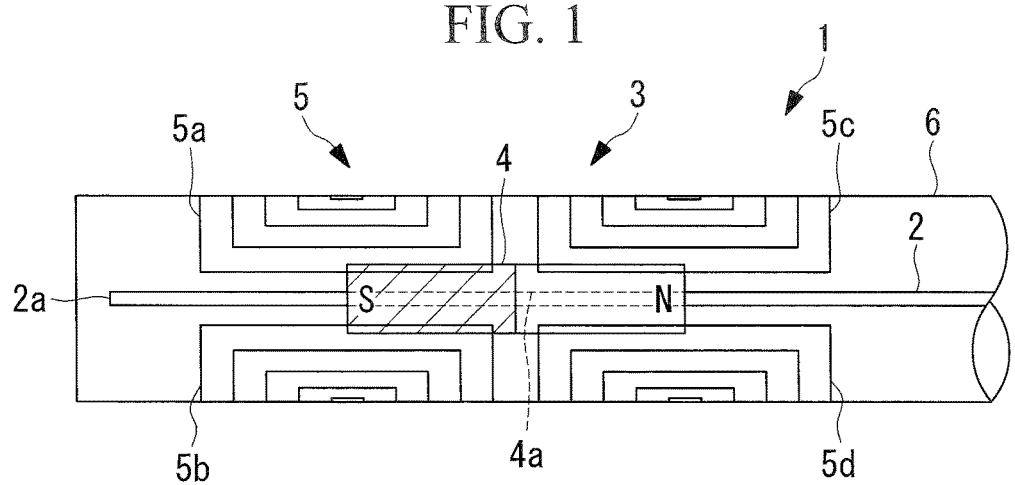
FIG. 1 is a diagram illustrating an optical scanning apparatus according to one embodiment of the present invention.

As illustrated in FIG. 1, the optical scanning apparatus 1 according to the present embodiment includes an optical fiber 2 which guides light from a light source (not illustrated) so that the light is emitted from an emission end 2a, and a driving unit 3 that displaces the emission end 2a of the optical fiber 2 in a radial direction of the optical fiber 2.

The driving unit 3 includes a permanent magnet (magnetic body) 4 fixed near the emission end 2a of the optical fiber 2, and a coil 5 generating a magnetic field to act on the permanent magnet 4. The permanent magnet 4 which is formed in the shape of a cylinder having a through hole 4a which penetrates in a longitudinal direction, has different magnetic poles at both ends in the longitudinal direction, and is fixed at the intermediate position of the longitudinal direction of the optical fiber 2 using an adhesive in a state where the optical fiber 2 penetrates into the through hole 4a.

The coil 5 includes a plurality of spiral coils 5a to 5d disposed along a surface of a cylindrical outer coat 6 disposed so as to surround the circumference of the optical fiber 2. By manufacturing coils on the cylindrical face, it is possible to make the optical scanning apparatus thinner easily. Each of the spiral coils 5a to 5d is formed in a saddle shape by being wound around a central axis orthogonal to the longitudinal direction of the outer coat 6 in a rectangular spiral shape and being disposed over a substantially half the circumference along the surface of the outer coat 6.

These saddle-shaped spiral coils 5a to 5d are disposed at four locations in total while each center of the coils is disposed near both ends in the longitudinal direction of the permanent magnet 4 and each pair of two coils are disposed at positions facing each other in a radial direction across the permanent magnet 4.

Figure 2:
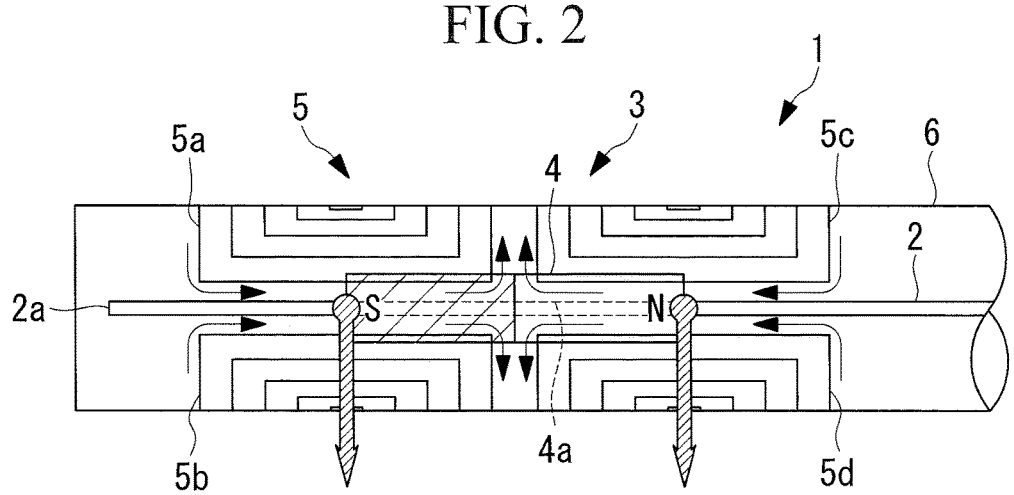
FIG. 2 is a diagram for explaining magnetic force acting on a permanent magnet when a resonance node exists outside the permanent magnet in the optical scanning apparatus of FIG. 1.

As indicated by the arrow in FIG. 2, by flowing current to the pair of spiral coils 5a and 5b facing each other in the radial direction across one end of the permanent magnet 4 in the same rotation direction, magnetic fields of the same direction are generated at positions at the end of the permanent magnet 4, and, thus, directions of magnetic force acting on both ends of the permanent magnet 4 become opposite, so that strength of the magnetic fields acting on the permanent magnet 4 is enhanced.

The operation of the optical scanning apparatus 1 according to the present embodiment having the configuration as described above will be described below.

In order to scan an observation object with illumination light using the optical scanning apparatus 1 according to the present embodiment, current is flown to the spiral coils 5a to 5d, thereby magnetic fields are generated between the pair of the spiral coils 5a and 5b, and 5c and 5d which face each other across both ends of the permanent magnet 4, and magnetic attractive force and magnetic repulsive force are generated at the respective magnetic poles provided at both ends of the permanent magnet 4, so that the permanent magnet 4 is displaced in a radial direction.

Because the permanent magnet 4 is fixed to the optical fiber 2, the optical fiber 2 is also displaced in the radial direction by the magnetic attractive force and the magnetic repulsive force acting on the permanent magnet 4. By selecting alternating current whose direction periodically changes as current to be flown to each of the spiral coils 5a to 5d, the directions of the magnetic fields acting on the permanent magnet 4 are periodically changed, so that it is possible to periodically change the displacement direction of the permanent magnet 4 and the optical fiber 2.

Further, by selecting an appropriate frequency as a frequency of the alternating current, the permanent magnet 4 is resonated, so that it is possible to displace the emission end 2a of the optical fiber 2 in a reciprocating manner at high speed. In this state, by generating illumination light from the light source and guiding the illumination light within the optical fiber 2, it is possible to scan the observation object with the illumination light emitted toward the observation object from the emission end 2a of the optical fiber 2 at high speed.

In this case, according to the optical scanning apparatus 1 according to the present embodiment, because the spiral coils 5a to 5d which generate magnetic fields respectively acting on the respective magnetic poles of both ends of permanent magnet 4 are provided, it is possible to individually adjust the magnetic fields generated at both ends of the permanent magnet 4. As a result, it is possible to adjust current to be applied to the spiral coils 5a to 5d so that optimal magnetic fields are generated at both ends of the permanent magnet 4 according to resonance modes occurring at the optical fiber 2 according to resonance frequencies, and efficiently reciprocate the emission end 2a of the optical fiber 2.

Here, a method for efficiently reciprocating the emission end 2a of the optical fiber 2 will be specifically described.

An example where the permanent magnet 4 has different magnetic poles at both ends of the longitudinal direction will be described below.

In the resonance mode of the optical fiber 2, when a resonance node exists outside the permanent magnet 4, because both ends of the permanent magnet 4 are displaced always in the same direction during oscillation, by generating magnetic force in the same direction at both ends of the permanent magnet 4, oscillation of the optical fiber 2 is less likely to be inhibited. That is, it is preferable to generate magnetic fields in opposite directions at both ends of the permanent magnet 4. Therefore, as illustrated in FIG. 2, by supplying current to the spiral coils 5a and 5b at one end and spiral coils 5c and 5d at the other end so that rotation directions of the current become opposite between the spiral coils 5a and 5b and the spiral coils 5c and 5d, it is possible to efficiently reciprocate the optical fiber 2.

An example where the resonance node exists outside the permanent magnet 4 will be described next.

Figure 13A:
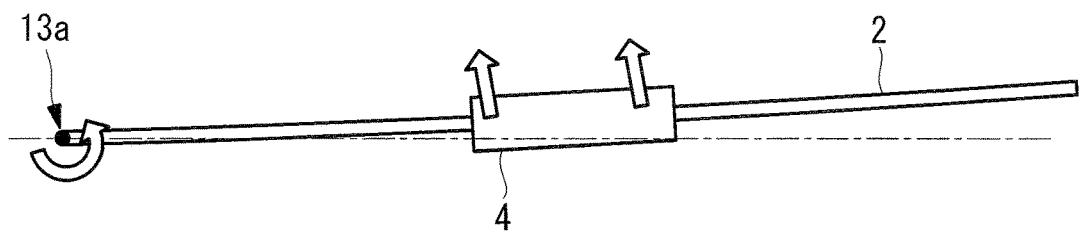
FIG. 13A is a diagram for explaining an oscillation mode of an optical fiber when a resonance node exists outside the permanent magnet, illustrating a case where an optical fiber oscillates by first order resonance or non-resonance.

An example of an oscillation shape of the optical fiber 2 in the case where the resonance mode is the first order mode is illustrated in FIG. 13A. In the case of the first order mode, only a fixed end for holding the optical fiber becomes the resonance node 13a, and both ends of the permanent magnet 4 are displaced always in the same direction during oscillation. If scanning speed is lowered by reducing a scanning frequency of the optical fiber 2, or if the optical fiber 2 is bent at a certain displacement degree without causing oscillation by flowing direct current component to the coil 5a to 5d instead of alternating current, the optical fiber 2 performs scanning with non-resonance. Also in this case, only the fixed end for holding the optical fiber becomes a node 13a of oscillation displacement as in the case of the first order mode, and both ends of the permanent magnet 4 are displaced always in the same direction during oscillation and displacement.

Figure 13B:
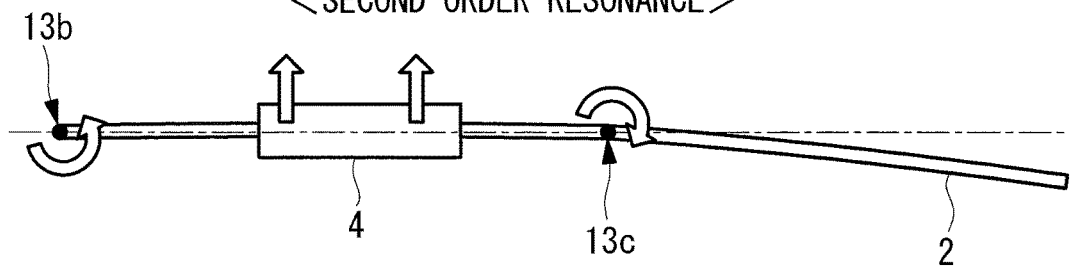
FIG. 13B is a diagram for explaining an oscillation mode of an optical fiber when a resonance node exists outside the permanent magnet, illustrating a case where an optical fiber oscillates by second order resonance.

An example of an oscillation shape of the optical fiber 2 in the case where the resonance mode is the second order mode is illustrated in FIG. 13(b).

In the case of the second order mode, there is another resonance node 13c in addition to the resonance node 13b at the fixed end for holding the optical fiber. In the case as illustrated in FIG. 13(b) where the permanent magnet 4 is disposed between the node 13b and the node 13c according to the arrangement and length of the permanent magnet 4, both ends of the permanent magnet 4 are displaced always in the same direction during oscillation. This displacement is the same also in the case where the permanent magnet 4 is disposed at a tip side from the node 13c.

Figure 13C:
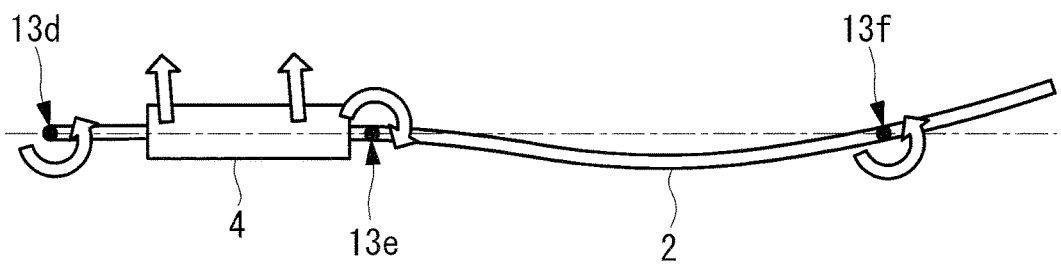
FIG. 13C is a diagram for explaining an oscillation mode of an optical fiber when a resonance node exists outside the permanent magnet, illustrating a case where an optical fiber oscillates by third order resonance.

Further, an example of the oscillation shape of the optical fiber 2 in the case where the resonance mode is the third order mode is illustrated in FIG. 13(c).

In the case of the third order mode, there is two more resonance nodes 13e and 13f in addition to the resonance node 13d at the fixed end for holding the optical fiber. In the case as illustrated in FIG. 13(c) where the permanent magnet 4 is disposed between the node 13d and the node 13e according to the arrangement and the length of the permanent magnet 4, both ends of the permanent magnet 4 are displaced always in the same direction during oscillation. This displacement is the same also in the case where the permanent magnet 4 is disposed between the node 13e and the node 13f, or the node 13e is disposed at a tip side from the node 13f.

Further, a pattern different from those described above will be specifically described.

Also in the following description, an example will be used where the permanent magnet 4 has different magnetic poles at both ends in the longitudinal direction.

Figure 3:
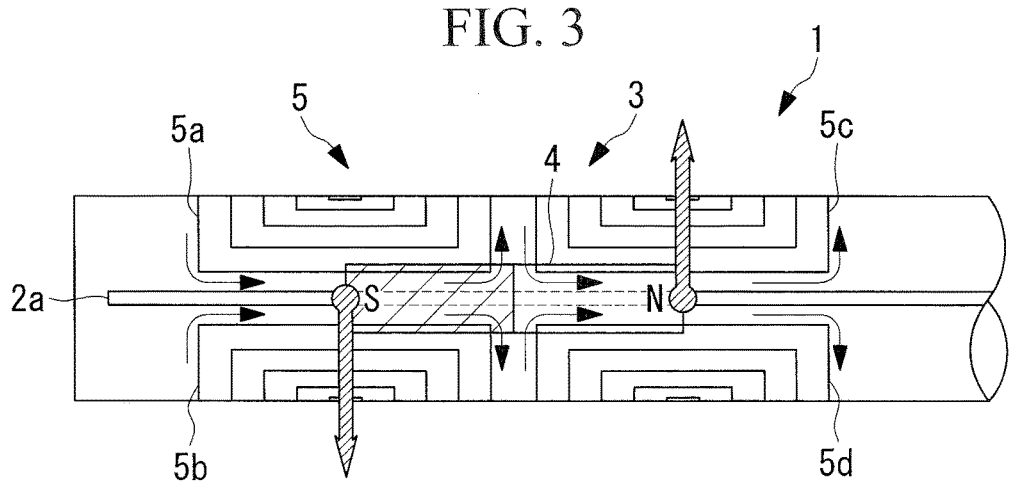
FIG. 3 is a diagram for explaining magnetic force acting on the permanent magnet when a resonance node exists outside the permanent magnet in the optical scanning apparatus of FIG. 1.

In the resonance mode occurring at the optical fiber 2, when the resonance node exists inside the permanent magnet 4, because both ends of the permanent magnet 4 are displaced always in opposite directions during oscillation, by generating magnetic force in opposite directions at both ends of the permanent magnet 4, oscillation of the optical fiber 2 is less likely to be inhibited. That is, it is preferable to generate magnetic fields in the same direction at both ends of the permanent magnet 4. Therefore, as illustrated in FIG. 3, by supplying current to the spiral coils 5a and 5b at one end and the spiral coils 5c and 5d at the other end so that rotation directions of the current become opposite between the spiral coils 5a and 5b and the spiral coils 5c and 5d, it is possible to efficiently reciprocate the optical fiber 2.

An example where the resonance node exists inside the permanent magnet 4 will be described next.

Figure 14A:
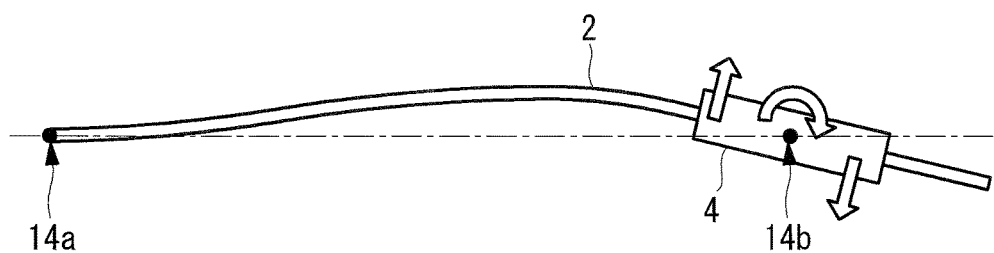
FIG. 14A is a diagram for explaining an oscillation mode of the optical fiber when a resonance node exists inside the permanent magnet, illustrating a case where the optical fiber oscillates by second order resonance.

An example of the oscillation shape of the optical fiber 2 in the case where the resonance mode is the second order mode is illustrated in FIG. 14A.

In the case of the second order mode, there is another resonance node 14b in addition to the resonance node 13a at the fixed end for holding the optical fiber. In the case as illustrated in FIG. 14A where the resonance node 14b exists inside the permanent magnet 4 according to the arrangement and the length of the permanent magnet 4, both ends of the permanent magnet 4 are displaced always in opposite directions during oscillation.

Figure 14B:
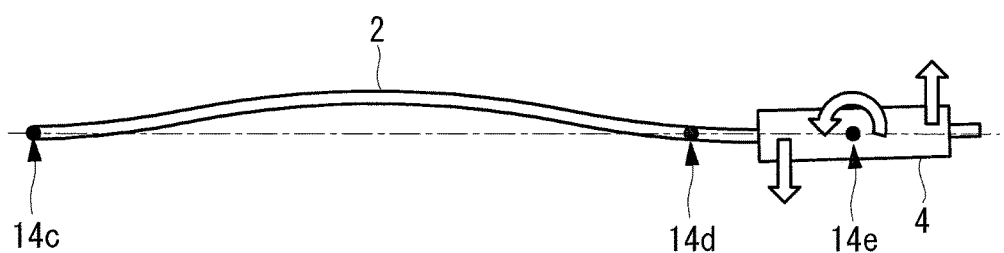
FIG. 14B is a diagram for explaining an oscillation mode of the optical fiber when a resonance node exists inside the permanent magnet, illustrating a case where the optical fiber oscillates by third order resonance.

Further, an example of the oscillation shape of the optical fiber 2 in the case where the resonance mode is the third order mode is illustrated in FIG. 14(b). In the case of the third order mode, there are two more resonance nodes 14d and 14e in addition to the resonance node 14c at the fixed end for holding the optical fiber. In the case as illustrated in FIG. 14(b) where the resonance node 14e exists inside the permanent magnet 4 according to the arrangement and the length of the permanent magnet 4, both ends of the permanent magnet 4 are displaced always in opposite directions during oscillation.

According to the optical scanning apparatus 1 according to the present embodiment, in all the cases including a case where the optical fiber 2 is resonated while a resonance mode is fixed at the first order resonance mode, the second order resonance mode or higher-order resonance mode, and a case where the optical fiber 2 is oscillated with non-resonance, it is possible to appropriately adjust magnitude and directions of the magnetic fields to be generated at both ends of the permanent magnet 4, so that there is an advantage in all the cases that it is possible to increase amplitude by efficiently resonating the optical fiber 2. Further, it is also possible to easily handle a case where the resonance state is changed among different resonance modes, by changing directions of the magnetic fields to be generated.

Figure 17:
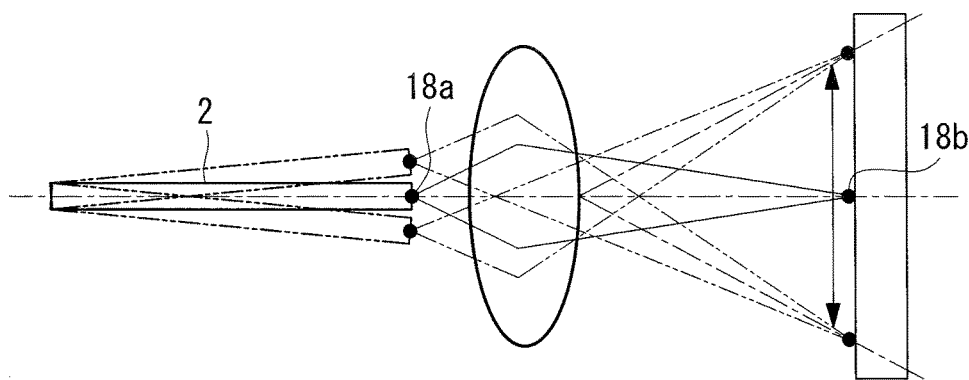
FIG. 17 is a diagram for explaining increase of a light scanning field angle in accordance with increase of amplitude of an emission end of the optical fiber.

Further, if the amplitude of the emission end of the optical fiber 2 increases, a light scanning field angle becomes large, which provides an advantage of enabling scanning of an object in a wide range. As illustrated in FIG. 17, if the optical system is provided in front of the optical fiber, it is possible to expand a scanning range. In FIG. 17, a tip 18a of the optical fiber and a focal point 18b have optically conjugate positional relationship.

Figure 18:
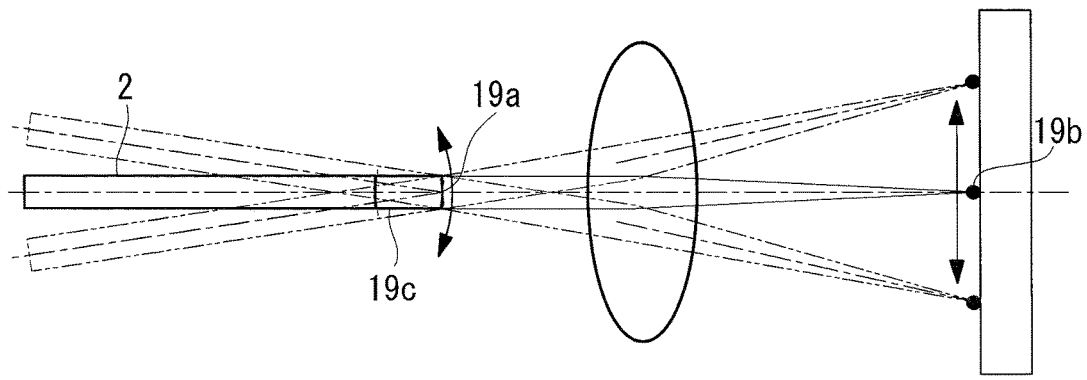
FIG. 18 is a diagram for explaining a light scanning field angle in a case where a collimate lens is provided at a tip of the optical fiber which becomes a pupil position of an optical system.

Further, if the amplitude of the emission end of the optical fiber 2 increases, angular displacement of the emission end of the optical fiber 2 also increases. Particularly, this effect is more noticeable in higher-order resonance. In order to expand the scanning range by utilizing the angular displacement, the optical system may be disposed as illustrated in FIG. 18. At a tip of the optical fiber 2, a collimator lens 19c is fused, so that light from the optical fiber 2 becomes parallel light. By disposing a tip 19a of the optical fiber 2 near a pupil position of the optical system, it is possible to provide an advantage of enabling expansion of the scanning range for the object by utilizing the angular displacement.

Figure 16:
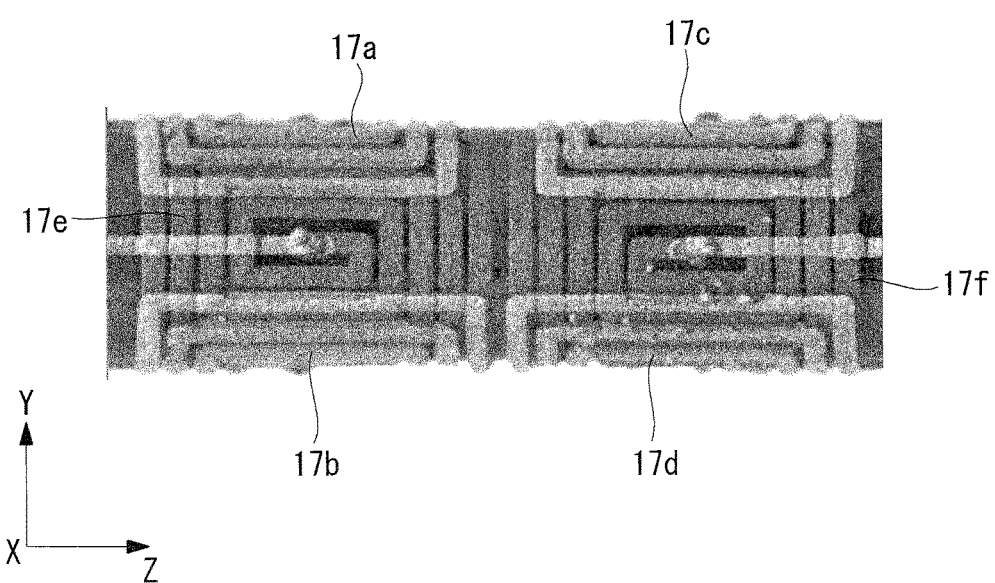
FIG. 16 is a microscope photograph in which saddle-shaped coils are formed on a cylindrical face so as to enable two-dimensional scanning.

While in the above description, a configuration where scanning is performed in one direction has been described, by providing a plurality of pairs of coils 17a to 17f in a circumferential direction as illustrated in FIG. 16, it is possible to realize two scanning directions. By disposing drive coils 17e and 17f for X direction and drive coils 17a to 17d for Y direction so that winding axes are substantially orthogonal to each other, it is possible to cause magnetic force in X direction and Y direction to independently act on the permanent magnet 4.

The drive coils 17e and 17f for X direction and the drive coils 17a to 17d for Y direction are independently formed with two layers, and coils 17a to 17f are insulated from each other by providing an insulating layer between the drive coils 17e and 17f for X direction and the drive coils 17a to 17d for Y direction. Therefore, the drive coils 17e and 17f for X direction and the drive coils 17a to 17d for Y direction may partially overlap with each other. By employing such a configuration, it is possible to make the optical fiber 2 oscillate in two directions which are substantially orthogonal to each other, so that it is possible to perform scanning with illumination light in a two-dimensional manner.

Figure 15:
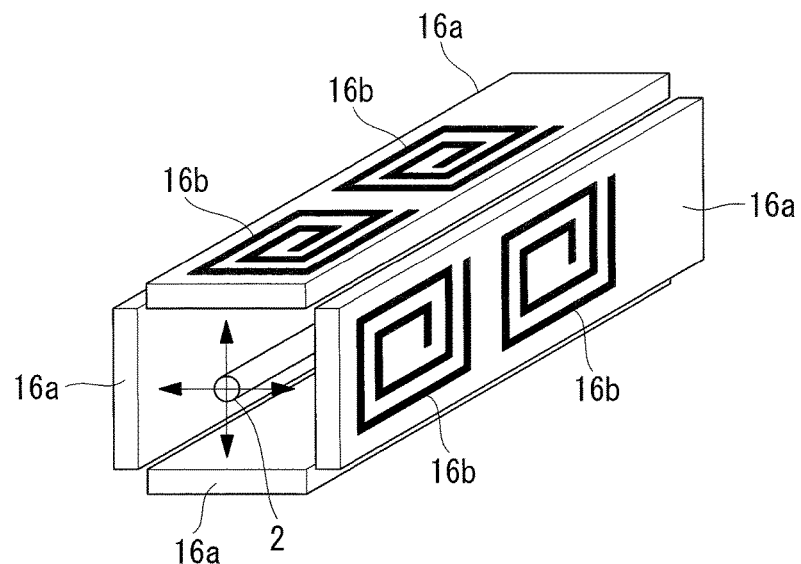
FIG. 15 is a diagram illustrating an example where spiral coils are disposed on a planar substrate.

Further, while, in the present embodiment, the spiral coils 5a, 5b, 5c and 5d disposed along a surface of a cylindrical outer coat 6 are described as examples, it is also possible to provide the same advantages by providing spiral coils 16b on planar substrates 16a as illustrated in FIG. 15 instead of the above-described spiral coils. For example, the spiral coil 16b is manufactured on a silicon substrate by utilizing semiconductor process.

By providing planar substrates 16a at four faces, it is possible to make the optical fiber 2 oscillate in two orthogonal directions, so that it is possible to perform scanning with illumination light in a two-dimensional manner. While in FIG. 15, the coils are formed outside, the coils are preferably provided inside. By providing the coils inside, distance between the magnetic body and the coils becomes small, which is advantageous because strength of the magnetic field acting on the magnetic body increases.

Figure 4:
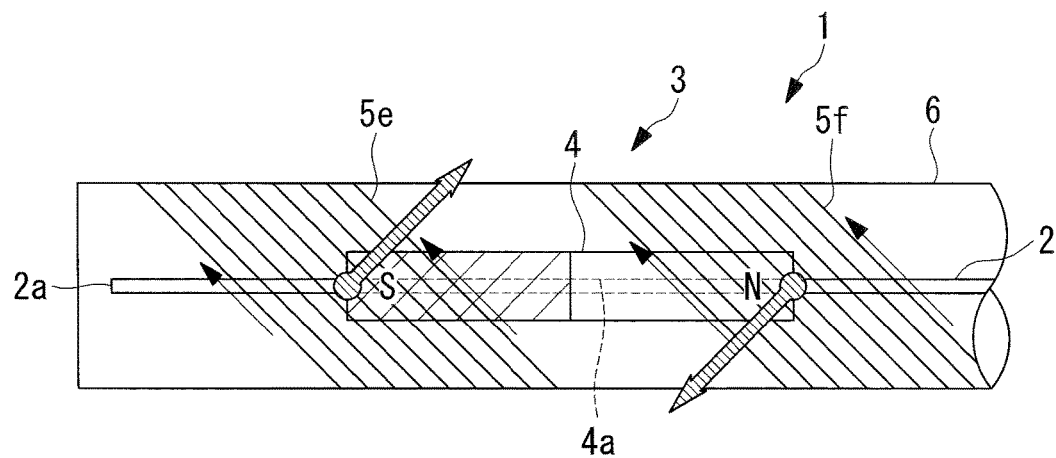
FIG. 4 is a diagram illustrating a first modified example of the optical scanning apparatus of FIG. 1.
Figure 5:
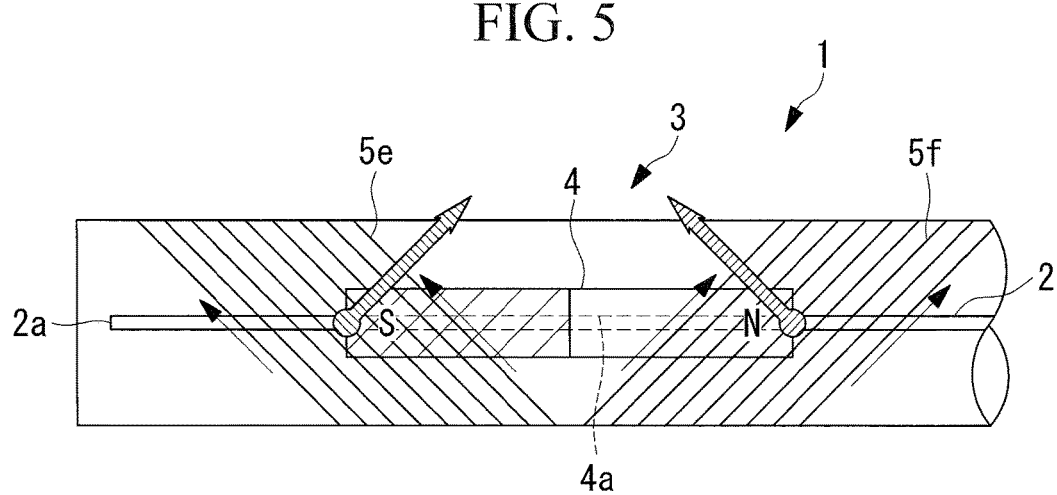
FIG. 5 is a diagram illustrating a modified example of the optical scanning apparatus of FIG. 4.

While, in the present embodiment, two pairs of four spiral coils 5a to 5d are described as an example of the coil 5, the present invention is not limited to this, and, as illustrated in FIG. 4 and FIG. 5, it is also possible to employ gradient coils 5e and 5f wound in a direction inclined with respect to the longitudinal direction of the optical fiber 2. In this case, it is only necessary to prepare two gradient coils 5e and 5f at positions respectively surrounding both ends of the permanent magnet 4.

The inclination directions of the gradient coils 5e and 5f may be the same as illustrated in FIG. 4, or opposite to each other as illustrated in FIG. 5. When the gradient coils 5e and 5f are inclined in the same direction as illustrated in FIG. 4, magnetic force acts obliquely right upward toward the south pole side of the permanent magnet 4 by the coil 5e and magnetic force acts obliquely left downward toward the north pole side of the permanent magnet 4 by the coil 5f. When the component of the magnetic force is decomposed into the longitudinal direction of the optical fiber and the axis direction orthogonal to the longitudinal direction, the component of the magnetic force in the longitudinal direction of the optical fiber is cancelled out. Therefore, because the magnetic force in opposite directions acts on both ends of the permanent magnet 4, it is advantageous when the oscillation node exists inside the permanent magnet 4.

Meanwhile, when the coils are inclined in opposite directions as illustrated in FIG. 5, magnetic force acts obliquely right upward toward the south pole side of the permanent magnet 4 by the coil 5e, and magnetic force acts obliquely left upward toward the north pole side of the permanent magnet 4 by the coil 5f. When the component of the magnetic force is decomposed into the longitudinal direction of the optical fiber and the axis direction orthogonal to the longitudinal direction, the component of the magnetic force in the longitudinal direction of the optical fiber is cancelled out.

Therefore, because the magnetic force in the same direction acts on both ends of the permanent magnet 4, it is advantageous when the oscillation node exists outside the permanent magnet 4. In both cases, the component of the magnetic force in the longitudinal direction of the optical fiber 2 is cancelled out, so that it is possible to double the component of the magnetic force to be used for resonance.

It is also possible to use the gradient coils 5e and 5f formed in two layers and laminate the gradient coils 5e and 5f which are inclined in opposite directions.

Figure 6:
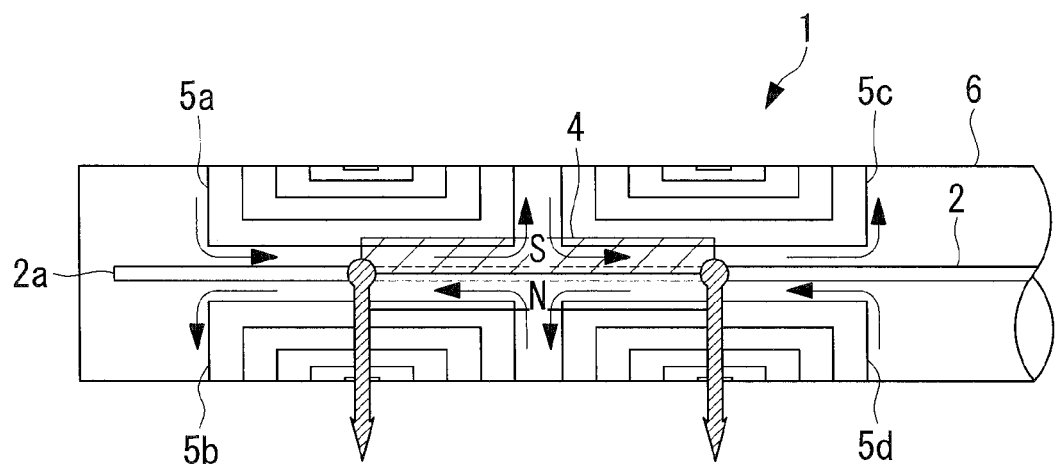
FIG. 6 is a diagram illustrating a second modified example of the optical scanning apparatus of FIG. 1.
Figure 7:
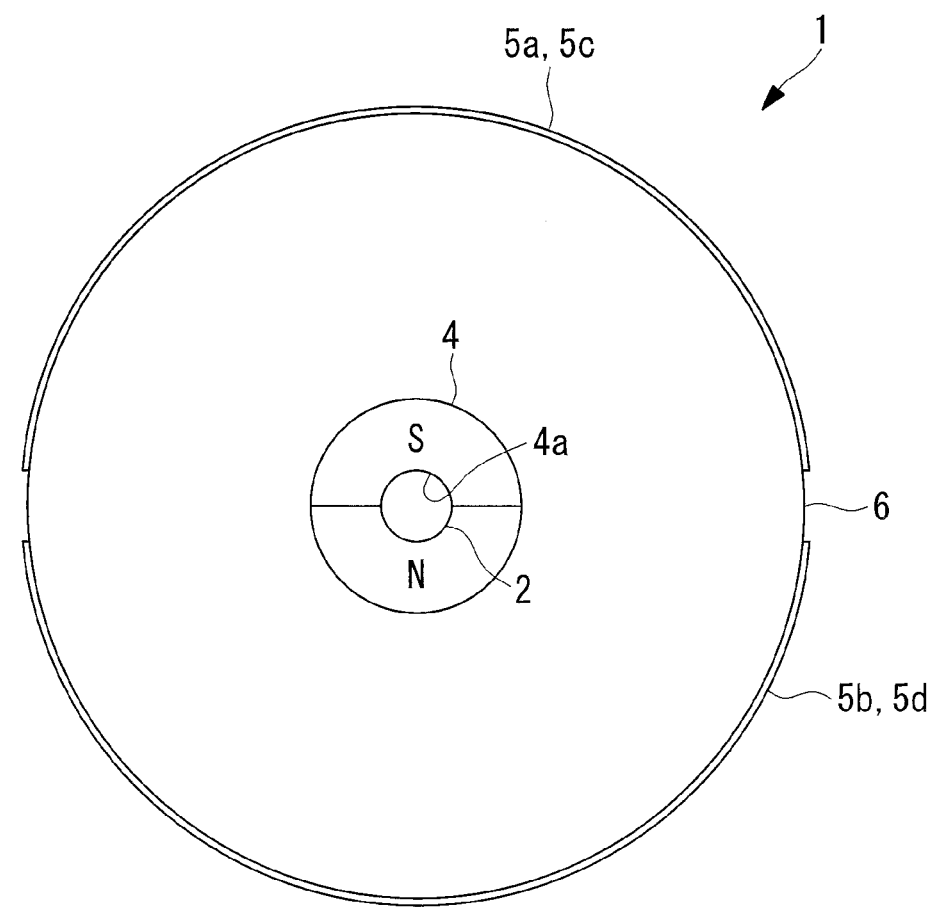
FIG. 7 is a front view illustrating the optical scanning apparatus of FIG. 6.

Further, while, in the present embodiment, the permanent magnet 4 which has different magnetic poles at both ends in the longitudinal direction has been described as an example, it is also possible to use a permanent magnet which has different magnetic poles adjacent to each other in a circumferential direction as illustrated in FIG. 6 and FIG. 7 instead of the above-described permanent magnet. In the example illustrated in FIG. 6 and FIG. 7, the two magnetic poles are respectively provided at halves of the circumference.

In this case, as illustrated in FIG. 6, by flowing current having the same rotation direction to the spiral coils 5a and 5b, 5c and 5d disposed at both ends of the permanent magnet 4, it is possible to cause the magnetic force in the same direction to act on both ends of the permanent magnet 4. Specifically, downward repulsive force acts on the left half and the right half of the south pole side of the permanent magnet 4 respectively by the coil 5a and the coil 5c.

Further, downward attractive force acts on the left half and the right half of the north pole side of the permanent magnet 4 respectively by the coil 5b and the coil 5d. Therefore, by flowing current as illustrated in FIG. 6, in the case where the oscillation node exists outside the permanent magnet 4, it is possible to efficiently oscillate the optical fiber 2.

Figure 8:
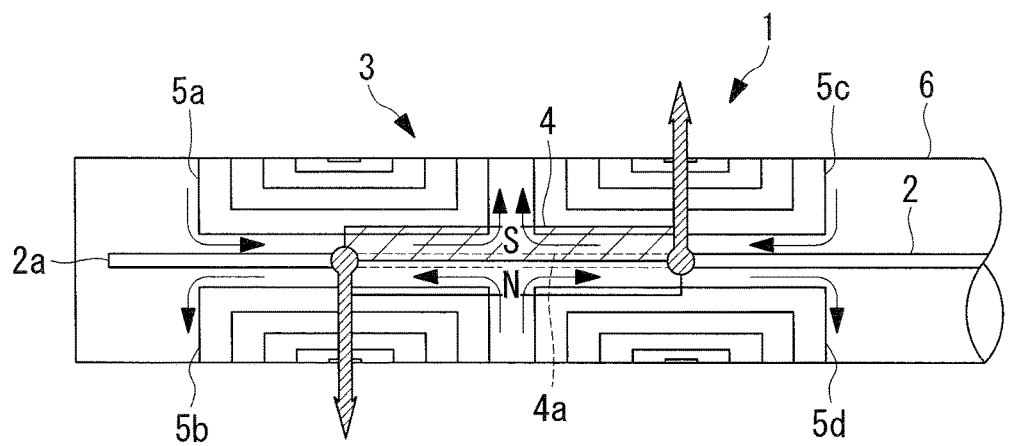
FIG. 8 is a diagram for explaining magnetic force acting on a permanent magnet when a resonance node exists outside the permanent magnet in the optical scanning apparatus of FIG. 6.

Further, as illustrated in FIG. 8, by flowing current having the opposite rotation directions to the spiral coils 5a and 5b, and 5c and 5d disposed at both ends of the permanent magnet 4, it is possible to cause the magnetic force in opposite directions to act on both ends of the permanent magnet 4. Specifically, downward repulsive force acts on the left half of the south pole side of the permanent magnet 4, and upward attractive force acts on the right half of the south pole side of the permanent magnet 4 respectively by the coil 5a and the coil 5c.

Further, downward attractive force acts on the left half of the north pole side of the permanent magnet 4, and the upward repulsive force acts on the right half of the north pole side of the permanent magnet 4 respectively by the coil 5b and the coil 5d. Therefore, by flowing current as illustrated in FIG. 8, in the case where the oscillation node exists inside the permanent magnet 4, it is possible to efficiently oscillate the optical fiber 2.

Figure 9:
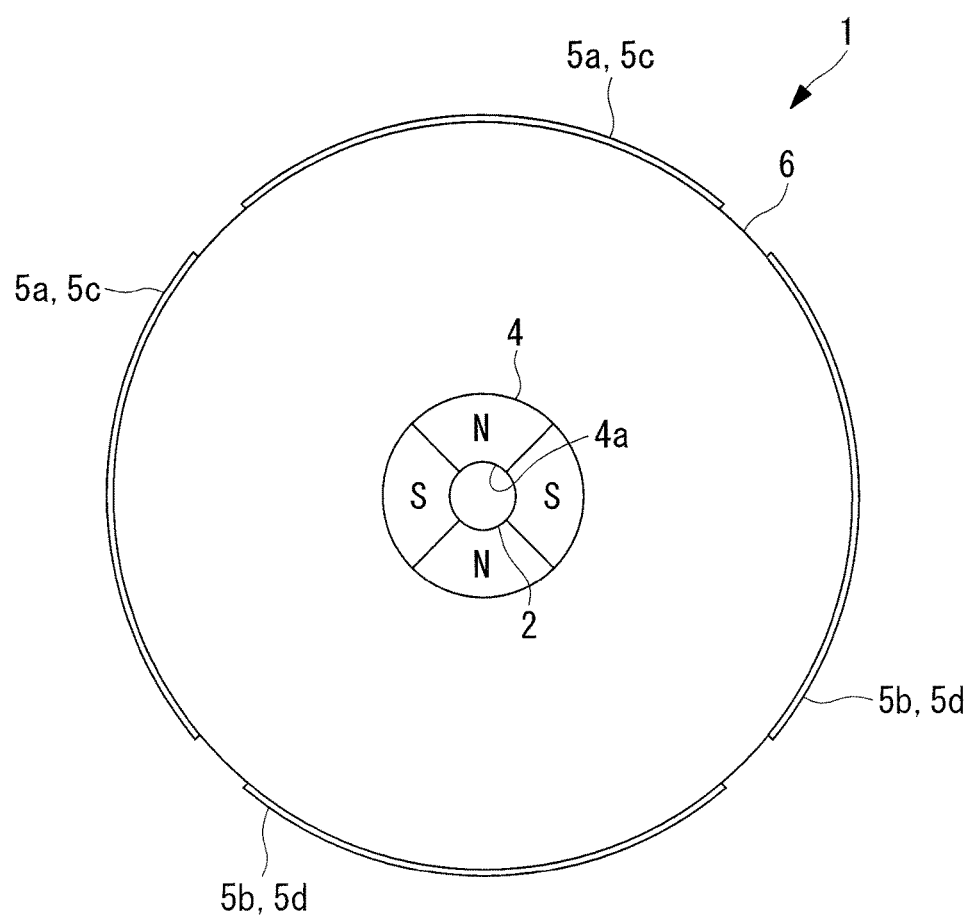
FIG. 9 is a diagram illustrating a third modified example of the optical scanning apparatus of FIG. 1.

Further, in this case, as illustrated in FIG. 9, it is also possible to provide four magnetic poles respectively at quarters of the circumference so that different magnetic poles are adjacent to each other, and provide two pairs of the spiral coils 5a and 5b (5c and 5d) across each end of the permanent magnet 4 in a radial direction so that different pairs are provided for each of 90 degrees in a circumferential direction. By this means, it is possible to resonate the permanent magnet 4 in two orthogonal directions each other, oscillate the emission end 2a of the optical fiber in a two-dimensional manner and perform scanning with illumination light in a two-dimensional manner.

Figure 10:
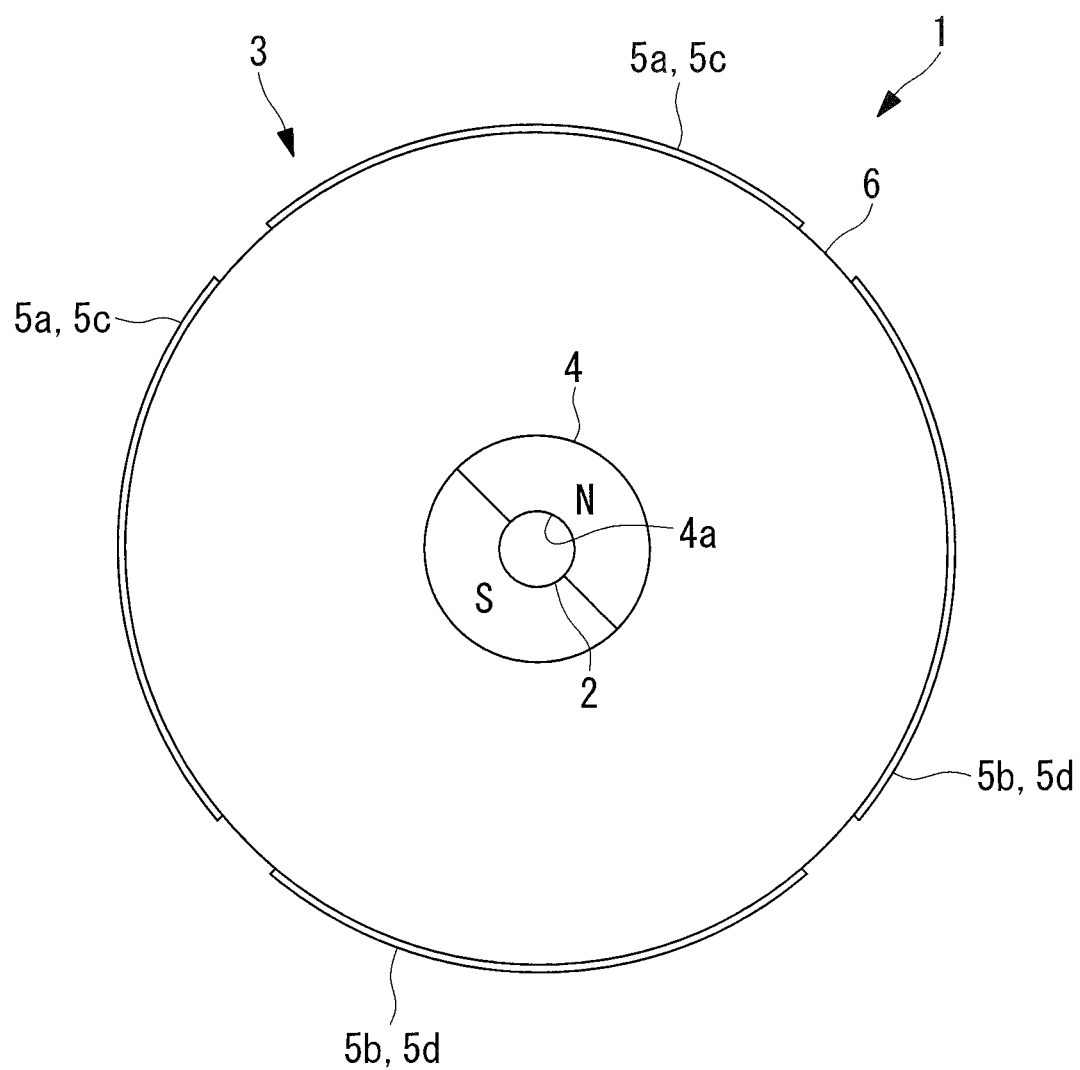
FIG. 10 is a diagram illustrating a modified example of the optical scanning apparatus of FIG. 9.

Further, as illustrated in FIG. 10, it is also possible to resonate the emission end 2a of the optical fiber 2 in a two-dimensional manner by disposing the permanent magnet 4 in which two magnetic poles are respectively provided at halves of the circumference so that the permanent magnet 4 is inclined in a circumferential direction with respect to the two pairs of four spiral coils 5a and 5b (5c and 5d).

Further, while a single rod-shaped permanent magnet 4 in which two magnetic poles are respectively provided at halves of the circumference is employed, it is also possible to dispose two permanent magnets 4 at positions separate from each other in the longitudinal direction of the optical fiber 2 in place of the single rod-shaped permanent magnet 4.

Figure 11:
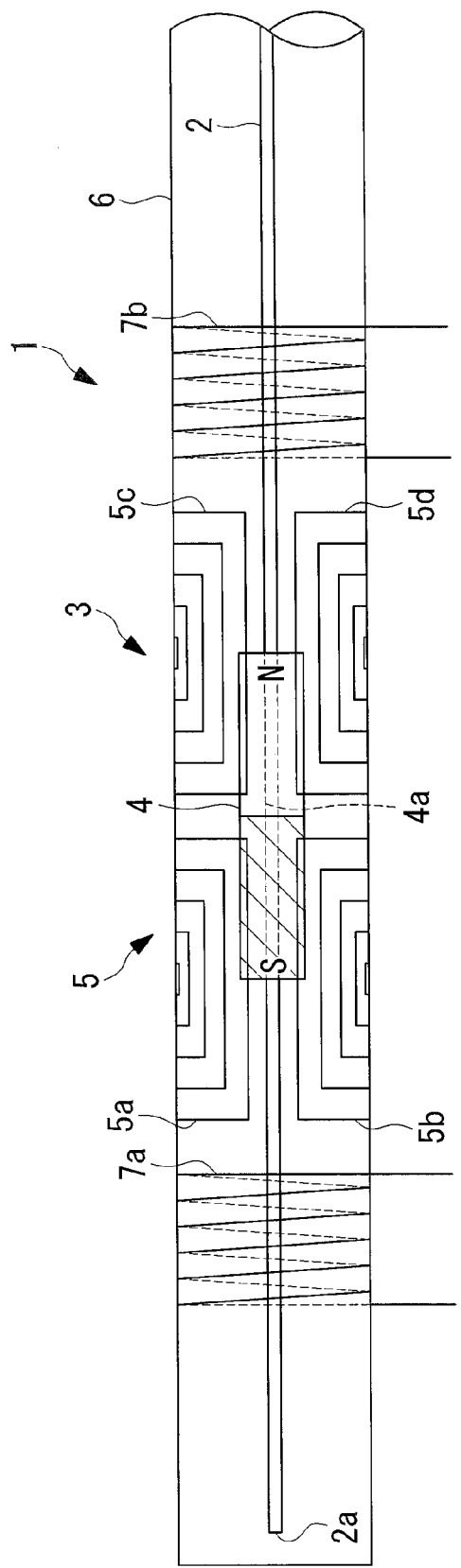
FIG. 11 is a diagram illustrating a fourth modified example of the optical scanning apparatus of FIG. 1.

Further, as illustrated in FIG. 11, it is also possible to dispose a pair of helical coils 7a and 7b across two pairs of spiral coils 5a to 5d and the permanent magnet 4 in the longitudinal direction and supply alternating current to the helical coils 7a and 7b in synchronization with alternating current to be supplied to the spiral coils 5a to 5d. In this case, it is only necessary to make a frequency of the current to be supplied to the helical coils 7a and 7b double the frequency of the current to be supplied to the spiral coils 5a to 5d, and cause magnetic repulsive force to act to move the end of the permanent magnet 4 in a direction away from the helical coils 7a and 7b and cause magnetic attractive force to act to make the end of the permanent magnet 4 approach the helical coils 7a and 7b. By this means, resonance of the permanent magnet 4 is assisted by the magnetic fields generated by the helical coils 7a and 7b, so that it is possible to further efficiently perform scanning with illumination light.

Further, while, in the above-described embodiment, the permanent magnet 4 having magnetic poles is employed as a magnetic body, it is also possible to employ a magnetic body 8 formed with a magnetic material which does not have a magnetic pole. As the magnetic body 8, the magnetic material may be coated on the surface of the optical fiber 2 or a cylindrical magnetic body 8 may be fixed using an adhesive, or the like.

Figure 12:
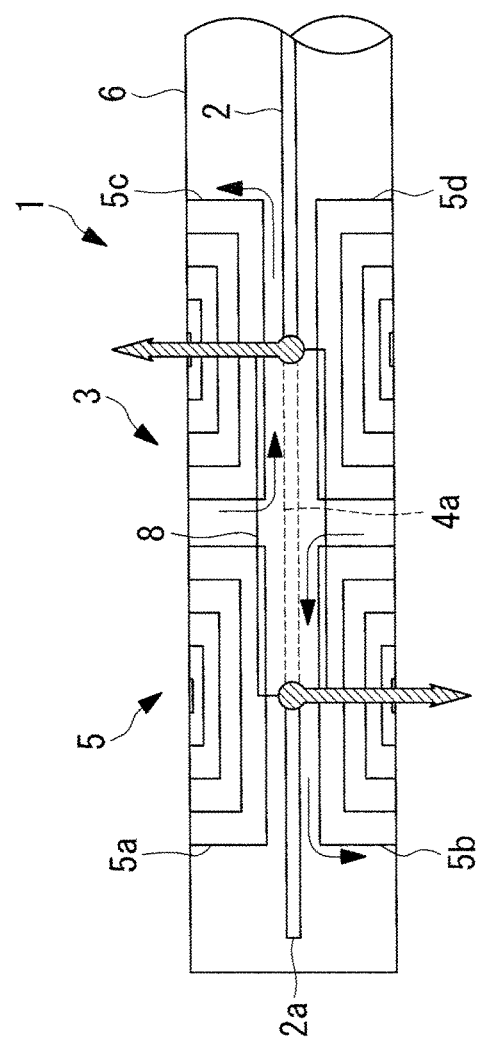
FIG. 12 is a diagram illustrating a fifth modified example of the optical scanning apparatus of FIG. 1.

In this case, as illustrated in FIG. 12, by alternately applying current to the two spiral coils 5b and 5c and the coils 5a and 5d which are provided across each end of the magnetic body 8 in a radial direction, it is possible to provide magnetic force in opposite directions at each end of the magnetic body 8. In this case, when the oscillation node exists inside the magnetic body 8, it is possible to efficiently oscillate the optical fiber 2. FIG. 12 illustrates a state where current is applied to only the spiral coils 5b and 5c.

Further, by alternately applying current to the spiral coils 5a and 5c and the spiral coils 5b and 5d, it is possible to provide magnetic force in the same direction to each end of the magnetic body 8. In this case, when the oscillation node exists outside the magnetic body 8, it is possible to efficiently oscillate the optical fiber 2.

Further, as illustrated in FIG. 19 to FIG. 22, it is also possible to use coils 20 formed in a figure of eight in place of the above-described spiral coils 5a to 5d.

Figure 19:
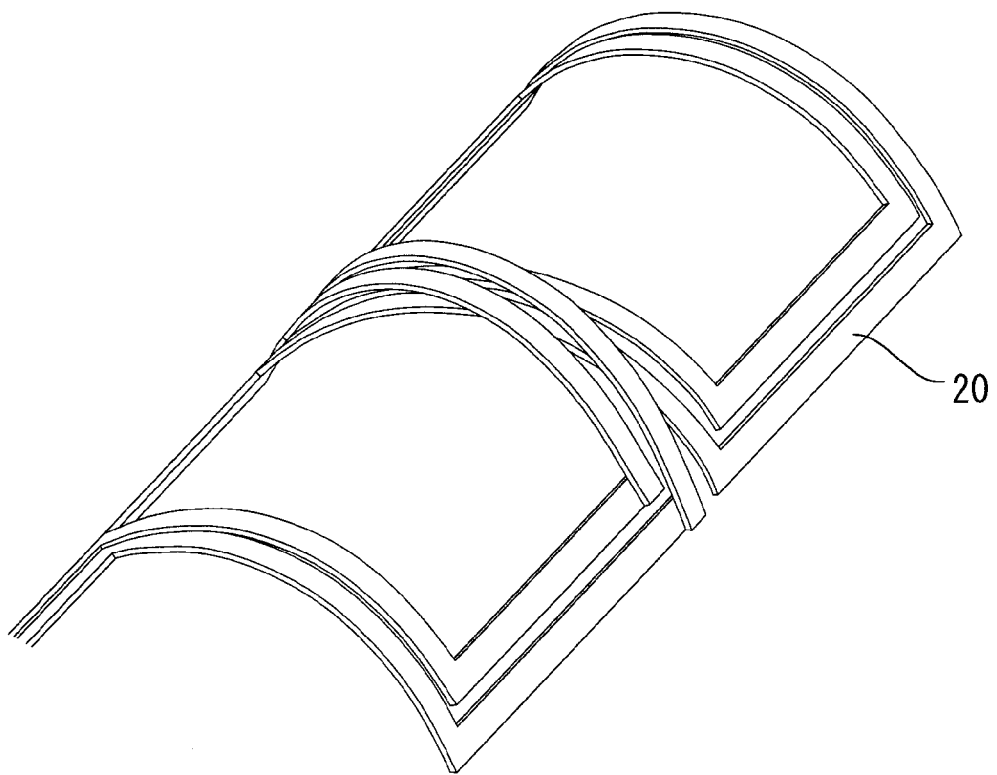
FIG. 19 is a perspective view for explaining a coil having the shape of a figure of eight.
Figure 20A:
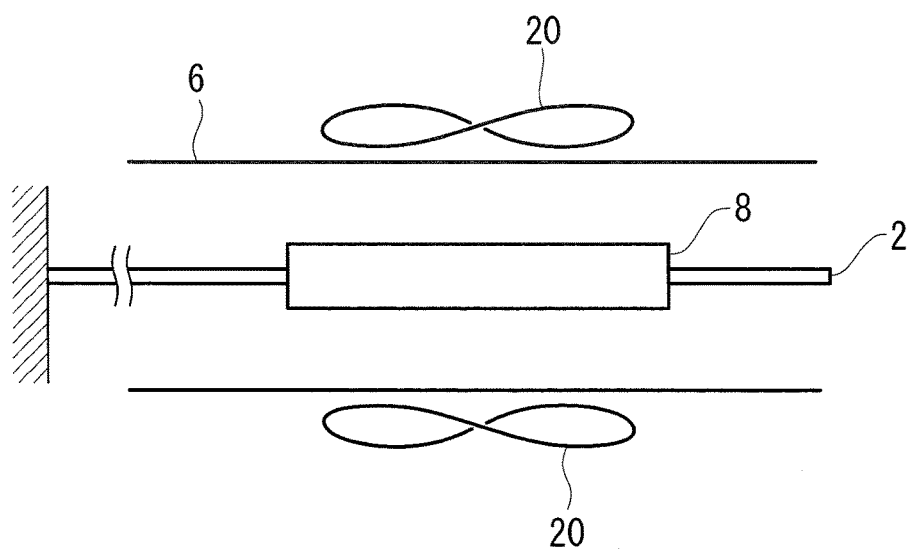
FIG. 20A is a diagram illustrating an optical scanning apparatus provided with the coils of FIG. 19, illustrating a state where power is not supplied.
Figure 20B:
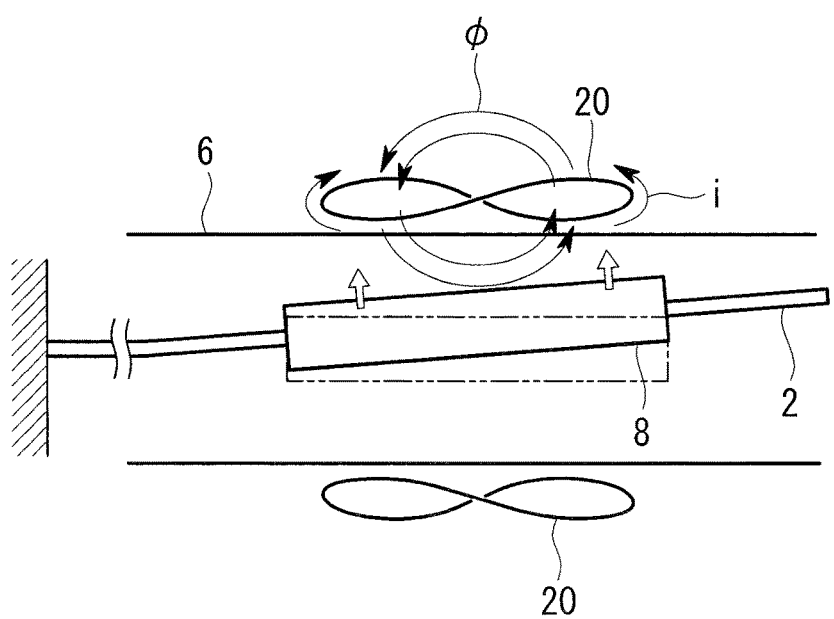
FIG. 20B is a diagram illustrating an optical scanning apparatus provided with the coils of FIG. 19, illustrating a state where power is supplied.

That is, as illustrated in FIG. 19, the coil 20 formed in a figure of eight is formed by twisting a circularly wound conducting wire at a substantially center position so that the conducting wire has two adjacent loops, and, when current i is flown, as illustrated in FIG. 20(b), circular magnetic field line Φ which penetrates two loops in opposite directions is formed.

By disposing these coils 20 at positions across the outer coat 6 in a diameter direction as illustrated in FIG. 20A in place of the coils 5a to 5d in FIG. 12, it is possible to make each coil 20 exert a function equivalent to two coils 5a and 5c or two coils 5b and 5d.

Figure 21:
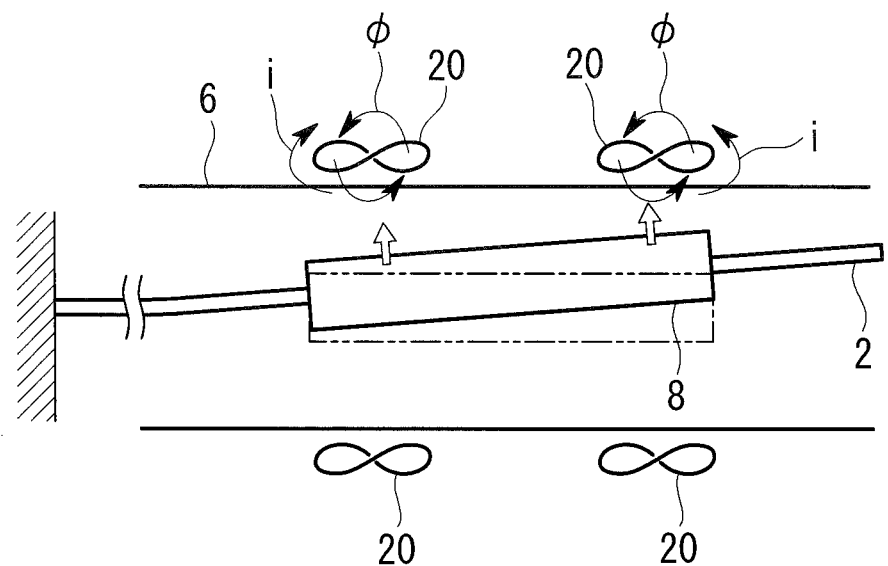
FIG. 21 is a diagram illustrating an optical scanning apparatus where a plurality of the coils of FIG. 19 are disposed so as to face each other at both ends in a longitudinal direction of a magnetic body.
Figure 22:
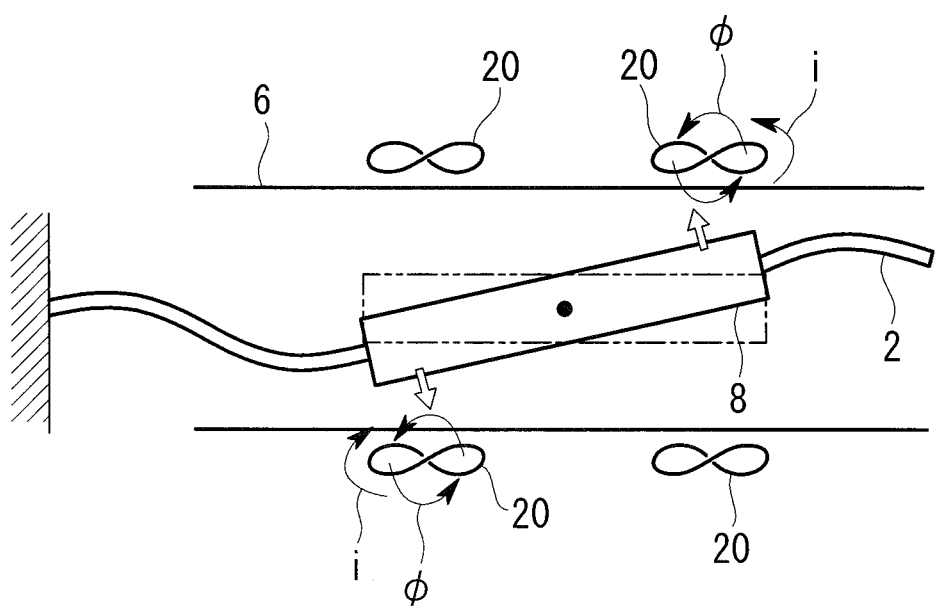
FIG. 22 is a diagram illustrating another operation state of the optical scanning apparatus of FIG. 21.

Further, as illustrated in FIG. 21 and FIG. 22, by disposing another coils 20 formed in a figure of eight at positions facing each other at both ends in the longitudinal direction of the magnetic body 8 and switching coils to which current is to be applied, it is possible to oscillate the magnetic body in various oscillation forms. In this case, it is also possible to employ the permanent magnet 4 as the magnetic body.

Further, while, in the above-described embodiment, the permanent magnet 4 having the magnetic poles is employed as the magnetic body, it is also possible to use an electromagnet formed by directly winding a copper wire coil around the optical fiber 2 such as a single mode fiber (Φ 125 μm) and by applying current. With this configuration, because the electromagnet is smaller than the magnetic body in a diameter direction and is lighter than the magnetic body, it is possible to realize a thinner scanner and increase a resonance frequency.

By winding a copper wire coil so that a winding axis of the copper wire coil becomes parallel to the longitudinal direction of the optical fiber 2, it is possible to realize an electromagnet equivalent to the permanent magnet which has magnetic poles divided in the longitudinal direction. By flowing direct current to this electromagnet and flowing alternating current to the surrounding coils 5a to 5d, it is possible to oscillate the optical fiber 2. Alternatively, by flowing alternating current to the electromagnet and flowing direct current to the surrounding coils 5a to 5d, it is also possible to oscillate the optical fiber 2.

The optical scanning apparatus of the present invention excels in its smaller size and amplitude property by replacing a piezo electrically-actuated configuration with an electromagnetically-actuated configuration of the present application in a spot illumination type optical scanning endoscope and its system as disclosed in PCT International Publication No. WO 2013/069382 where fibers for illumination and fibers for detection are formed with different fibers. In a similar manner, the electromagnetically-actuated optical scanning apparatus of the present invention can be favorably applied to an optical scanning endoscope comprised of a confocal optical system and its system as disclosed in Japanese Unexamined Patent Application, Publication No. 2007-275220 where fibers for illumination and fibers for detection are formed with the same fibers.

On the basis of the embodiment described above, inventions as follows are derived.

According to the present aspect, the magnetic fields are periodically changed by flowing alternating current to the coils provided at the magnetic field generating unit, and the optical fiber and the magnetic body are resonated by causing the magnetic fields to act on the magnetic body at positions separate from each other in the longitudinal direction of the optical fiber, so that it is possible to perform scanning with the illumination light emitted from the emission end while displacing the emission end of the optical fiber in a radial direction. In this case, the magnetic fields to act on each position of the magnetic body can be individually adjusted by the plurality of coils, so that it is possible to efficiently increase amplitude of the emission end by generating appropriate magnetic fields according to the resonance modes, and efficiently perform scanning with the illumination light.

In the above-described aspect, each of the coils may be wound around an axis line which intersects with the axis line of the optical fiber.

By this means, it is possible to generate magnetic field lines along the axis line which intersects with the axis line of the optical fiber by flowing current to each coil, and cause magnetic fields to act in a direction intersecting with the axis line of the optical fiber at each position of the magnetic body fixed to the optical fiber.

Further, in the above-described aspect, each of the coils may be a saddle-shaped spiral coil which is wound around the axis line orthogonal to a longitudinal axis of the cylindrical face along the cylindrical face surrounding the optical fiber.

By this means, it is possible to effectively utilize space around the optical fiber and efficiently generate magnetic force effective to displace the emission end of the optical fiber in a radial direction.

Further, in the above-described aspect, the spiral coils may be provided at positions facing each other across each position of the magnetic body in a radial direction.

By this means, a plurality of spiral coils facing each other across the magnetic body in the radial direction generate further stronger magnetic fields, so that it is possible to efficiently perform scanning with illumination light.

Further, in the above-described aspect, a plurality of pairs of the spiral coils may be provided adjacent to each other in a circumferential direction.

By this means, it is possible to cause magnetic fields in two or more directions which intersect with the axis line of the optical fiber and which intersect with each other, to act on the magnetic body, so that it is possible to enable the emission end of the optical fiber to perform scanning in a two-dimensional manner.

Further, in the above-described aspect, each of the coils may be a gradient coil which is wound along the cylindrical face surrounding the optical fiber in an inclined manner with respect to the longitudinal axis of the cylindrical face.

By this means, it is possible to cause magnetic fields which intersect with the axis line of the optical fiber to act on the magnetic body and easily displace the emission end of the optical fiber.

Further, in the above-described aspect, each of the coils may be a spiral coil which is formed on a substrate of the same plane and which is wound around an axis line orthogonal to the axis line of the optical fiber.

Further, in the above-described aspect, the spiral coils may be provided at positions facing each other across each position of the magnetic body in a radial direction of the optical fiber.

Further, in the above-described aspect, a plurality of pairs of the spiral coils may be provided on a substrate orthogonal to the substrate.

Further, in the above-described aspect, when an oscillation node of the optical fiber exists inside the magnetic body, the magnetic field of each of the coils may be adjusted so as to cause magnetic forces opposite to each other to act on both ends of the magnetic body.

Further, in the above-described aspect, when an oscillation node of the optical fiber exists outside the magnetic body, the magnetic field of each of the coils may be adjusted so as to cause magnetic forces of the same direction as each other to act on both ends of the magnetic body.

Further, in the above-described aspect, each of the coils and the magnetic body may be disposed so that a winding axis of each of the coils passes near both ends of the magnetic body.

Further, in the above-described aspect, a pair of helical coils may be disposed across each of the coils and the magnetic body in the longitudinal direction of the optical fiber, and winding axes of the helical coils may be parallel to the longitudinal direction of the optical fiber.

Further, in the above-described aspect, a frequency of alternating current to be supplied to the helical coils may be double the frequency of alternating current to be supplied to the coils.

Further, in the above-described invention, the magnetic body may be a permanent magnet in which different magnetic poles are provided in the longitudinal direction of the optical fiber.

By this means, when the magnetic fields of the same direction are caused to act on different magnetic poles, in a resonance mode where a resonance node exists inside the magnetic body, it is possible to efficiently increase amplitude of the emission end of the optical fiber and efficiently perform scanning with light. Further, when the magnetic fields of opposite directions are caused to act on different magnetic poles, in a resonance mode where a resonance node exists outside the magnetic body, or during non-resonance scanning, it is possible to efficiently increase amplitude of the emission end of the optical fiber and efficiently perform scanning with light.

Further, in the above-described invention, the magnetic body may be a permanent magnet where different magnetic poles are alternately provided adjacent to each other in a circumferential direction of the optical fiber.

By this means, when the magnetic fields of the same direction are caused to act on positions separate from each other in the longitudinal direction of the optical fiber, in a resonance mode in which a resonance node exists outside the magnetic body or during non-resonance scanning, it is possible to efficiently increase amplitude of the emission end of the optical fiber and efficiently perform scanning with light. Further, when the magnetic fields of opposite directions are caused to act, in a resonance mode where a resonance node exists inside the magnetic body, it is possible to efficiently increase amplitude of the emission end of the optical fiber and efficiently perform scanning with light.

Further, in the above-described aspect, it is also possible to provide an electromagnetic coil which is formed around the optical fiber and which has a winding axis parallel to the longitudinal direction of the optical fiber, in place of the magnetic body fixed to the optical fiber.

Further, in the above-described aspect, each of the coils may be a coil formed in a figure of eight by twisting a circularly wound conducting wire at a substantially center position.

Further, another aspect of the present invention is an optical scanning apparatus including an optical fiber that guides illumination light emitted from a light source so that the illumination light is emitted from an emission end, a magnetic body fixed to the optical fiber, and a magnetic field generating unit that changes a magnetic field to act on the magnetic body so as to displace a position of the emission end in a radial direction by magnetic force, the magnetic field generating unit being a coil formed in a figure of eight by twisting a circularly wound conducting wire at a substantially center position.

Advantageous Effects of Invention

The present invention provides advantage that it is possible to efficiently perform scanning with light while efficiently increasing amplitude of the emission end of the optical fiber.

The invention claimed is:

1. An optical scanning apparatus comprising:
    an optical fiber that guides illumination light emitted from a light source so that the illumination light is emitted from an emission end;
    an elongated magnetic body that is fixed to an outer surface of the optical fiber, the elongated magnetic body being arranged in a direction in which a longitudinal direction thereof is parallel to a longitudinal direction of the optical fiber; and
    a plurality of coils that change a magnetic field to act on the elongated magnetic body to displace a position of the emission end in a direction orthogonal to the longitudinal direction of the optical fiber by magnetic force,
    wherein:
        a winding axis of at least one individual coil of the plurality of coils is offset in the longitudinal direction of the optical fiber relative to a winding axis of at least one other individual coil of the plurality of coils; and
        at least a portion of each of the individual coils of the plurality of coils overlap with at least a portion of the elongated magnetic body in the longitudinal direction.

2. The optical scanning apparatus according to claim 1, wherein each of the plurality of coils is wound around a winding axis intersecting with an axis line of the optical fiber.

3. The optical scanning apparatus according to claim 2, wherein each of the plurality of coils is a saddle-shaped spiral coil wound around a winding axis orthogonal to a longitudinal axis of a cylindrical face surrounding the optical fiber along the cylindrical face.

4. The optical scanning apparatus according to claim 3, wherein the spiral coils are disposed at positions facing each other across the magnetic body in a radial direction.

5. The optical scanning apparatus according to claim 3, wherein a plurality of pairs of the spiral coils are disposed in a circumferential direction.

6. The optical scanning apparatus according to claim 2, wherein each of the plurality of coils is a spiral coil which is formed on a substrate of the same plane and which is wound around an axis line orthogonal to the longitudinal direction of the optical fiber.

7. The optical scanning apparatus according to claim 6, wherein the spiral coils are disposed at positions facing each other across the magnetic body in a radial direction of the optical fiber.

8. The optical scanning apparatus according to claim 6, wherein a plurality of pairs of the spiral coils are disposed on a substrate orthogonal to the substrate.

9. The optical scanning apparatus according to claim 1, wherein, when an oscillation node of the optical fiber exists inside the magnetic body, a magnetic field of each of the plurality of coils is adjusted so that magnetic forces in directions opposite to each other act on both ends of the magnetic body.

10. The optical scanning apparatus according to claim 1, wherein, when an oscillation node of the optical fiber exists outside the magnetic body, a magnetic field of each of the plurality of coils is adjusted so that magnetic forces in the same direction as each other act on both ends of the magnetic body.

11. The optical scanning apparatus according to claim 1, wherein a pair of helical coils are disposed at positions across each of the plurality of coils and the magnetic body in a longitudinal direction of the optical fiber, and winding axes of the helical coils are parallel to the longitudinal direction of the optical fiber.

12. The optical scanning apparatus according to claim 11, wherein a frequency of alternating current to be supplied to the helical coils is double a frequency of alternating current to be supplied to the plurality of coils.

13. The optical scanning apparatus according to claim 1, wherein the magnetic body is a permanent magnet in which different magnetic poles are provided in the longitudinal direction of the optical fiber.

14. The optical scanning apparatus according to claim 1, wherein the magnetic body is a permanent magnet in which different magnetic poles are alternately provided adjacent to each other in a circumferential direction of the optical fiber.

15. The optical scanning apparatus according to claim 1, wherein the optical scanning apparatus comprises an electromagnetic coil in place of the magnetic body fixed to the optical fiber, the electromagnetic coil being formed at a circumference of the optical fiber and having a winding axis parallel to the longitudinal direction of the optical fiber.

16. An optical scanning apparatus according to claim 1, wherein the plurality of coils are arranged across the elongated magnetic body in the longitudinal direction of the optical fiber such that each winding axis of the plurality of coils passes one of the ends of the magnetic body.

17. An optical scanning apparatus according to claim 1, wherein the plurality of coils are arranged relative to the elongated magnetic body in the longitudinal direction of the optical fiber such that each winding of the plurality of coils overlaps with an end of the elongated magnetic body in the longitudinal direction.

* * * * *